US009748725B2

(12) United States Patent
Zhao et al.

(10) Patent No.: US 9,748,725 B2
(45) Date of Patent: Aug. 29, 2017

(54) MULTIPASS FIBER AMPLIFIERS

(71) Applicant: Advanced Optowave Corporation, Ronkonkoma, NY (US)

(72) Inventors: Xiaojie Zhao, Stony Brook, NY (US); Chun He, Fremont, CA (US)

(73) Assignee: Advanced Optowave Corporation, Ronkonkoma, NY (US)

(*) Notice: Subject to any disclaimer, the term of this patent is extended or adjusted under 35 U.S.C. 154(b) by 0 days.

(21) Appl. No.: 15/530,060

(22) Filed: Nov. 29, 2016

(65) Prior Publication Data

US 2017/0085052 A1 Mar. 23, 2017

Related U.S. Application Data

(63) Continuation-in-part of application No. 13/999,936, filed on Apr. 4, 2014, now Pat. No. 9,531,149.

(51) Int. Cl.
| H01S 3/067 | (2006.01) |
| H01S 3/23 | (2006.01) |
| G02B 27/28 | (2006.01) |
| H01S 3/00 | (2006.01) |
| H01S 3/094 | (2006.01) |
| G02B 5/30 | (2006.01) |
| H01S 3/10 | (2006.01) |

(52) U.S. Cl.
CPC ........ *H01S 3/06754* (2013.01); *G02B 5/3083* (2013.01); *G02B 27/283* (2013.01); *G02B 27/286* (2013.01); *H01S 3/0078* (2013.01); *H01S 3/06712* (2013.01); *H01S 3/06787* (2013.01); *H01S 3/094003* (2013.01); *H01S 3/094053* (2013.01); *H01S 3/10023* (2013.01); *H01S 3/2333* (2013.01); *H01S 2301/02* (2013.01)

(58) Field of Classification Search
CPC .. H01S 3/06787; H01S 3/0078; G02B 5/3083
See application file for complete search history.

(56) References Cited

U.S. PATENT DOCUMENTS 5,272,560 A * 12/1993 Baney ................. H01S 3/06795
359/249
5,303,314 A * 4/1994 Duling, III ............. G02B 6/274
359/341.1
5,546,222 A 8/1996 Grossman et al.
5,615,043 A 3/1997 Grossman et al.
5,801,878 A * 9/1998 Bourret ............ H01S 3/094003
359/341.2

(Continued)

*Primary Examiner* — Eric Bolda
(74) *Attorney, Agent, or Firm* — Suganda Jutamulia

(57) ABSTRACT

A multipass fiber amplifier comprises a micro-optic-module polarization separating device including a first ASE blocking device, a micro-optic-module 90° polarization rotating reflector including a second ASE blocking device, a pump source for providing pump light; a micro-optic-module wavelength-division multiplexer (WDM) for combining the pump light and the laser beam; and a gain fiber having a first end and a second end for amplifying the laser beam using the pump light, where the first ASE blocking device is coupled to the first end of the gain fiber and the second ASE blocking device is coupled to the second end of the gain fiber.

19 Claims, 15 Drawing Sheets

(56) References Cited

U.S. PATENT DOCUMENTS

| | | | |
|---|---|---|---|
| 6,014,485 A * | 1/2000 | Pan | G02B 6/0218 385/140 |
| 6,384,966 B1 * | 5/2002 | Dymott | H01S 3/2333 359/347 |
| 6,483,859 B1 * | 11/2002 | Drake, Jr. | H01S 3/2341 372/106 |
| 6,873,639 B2 | 3/2005 | Zhang | |
| 7,289,263 B1 * | 10/2007 | Starodoumov | H01S 3/06754 359/347 |
| 7,796,671 B2 | 9/2010 | Peng et al. | |
| 7,912,374 B1 * | 3/2011 | Wang | G02B 3/0087 359/634 |
| 8,508,844 B2 | 8/2013 | Hertwig et al. | |
| 8,605,355 B2 | 12/2013 | Lundquist et al. | |
| 2002/0167721 A1 * | 11/2002 | Caplan | H01S 3/06754 359/347 |
| 2003/0091261 A1 * | 5/2003 | Wu | G02B 6/2706 385/11 |
| 2009/0245304 A1 * | 10/2009 | Peng | H01S 3/2333 372/29.02 |
| 2014/0050238 A1 * | 2/2014 | Kakui | H01S 3/2308 372/25 |

\* cited by examiner

MULTIPASS FIBER AMPLIFIERS

CROSS-REFERENCE TO RELATED APPLICATIONS

This application claims priority as a continuation-in-part application of U.S. patent application Ser. No. 13/999,936 filed on Apr. 4, 2014, which is hereby incorporated by reference in its entirety.

FIELD OF THE INVENTION

This invention relates to fiber amplifiers for fiber lasers and more specifically to multipass fiber amplifiers that use a gain fiber to perform multipass amplification.

BACKGROUND OF THE INVENTION

Fiber lasers are used for laser cutting, welding, and folding of metals and polymers. High peak power and nanosecond pulses enable effective marking and engraving. The additional power and better beam quality provide cleaner cut edges and faster cutting speeds. A fiber laser typically comprises an oscillator and multiple stages of fiber amplifiers. The oscillator sets the laser's wavelength, pulse width, and repetition rate, while the fiber amplifiers boost the laser power to a required level.

Currently a fiber amplifier system used in a fiber laser comprises multiple amplifier stages working in tandem. Each amplifier stage increases the laser power by a limited factor—typically, a factor between a few to a few tens. For example, a fiber amplifier system 100 is shown in FIG. 1 comprising an amplifier 102 (first amplifier stage), an amplifier 104 (second amplifier stage), and an amplifier 106 (third amplifier stage). Pump laser diodes 108, 110, and 112 are coupled to amplifiers 102, 104, and 106, respectively. Optical directional isolators 114, 116, and 118 are coupled to the outputs of amplifiers 102, 104, and 106, respectively. A laser beam from an oscillator enters first amplifier 102, is amplified in amplifiers 102, 104, and 106, and finally leaves third amplifier 106.

Each amplification stage also requires a printed circuit board (PCB) for controlling pump laser diode, a laser cooling mechanism, a pump light transfer fiber optic patch cord, and a pump coupling wavelength-division multiplexer (WDM) (all not shown). The cost increases as the number of required amplifier stage increases. Furthermore, the tandem fiber amplifier scheme has very long fiber path and has many fiber junctions between amplifiers. The long fiber path and large number of fiber junctions impose reliability issue for the fiber laser. Accordingly, better performance and lower cost fiber amplifiers for fiber lasers are desired.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

A fiber laser adopting multiple stages of amplification suffers from the strong amplified spontaneous emission (ASE) intrinsically embedded within the fiber amplifiers. In a free-space based laser amplifier, such as a rare earth element doped free-space crystal amplifier, the ASE is effectively filtered out by the amplifier since the ASE is emitted at all directions, unlike the laser beam that propagates along the laser optical axis with very small divergence angle. In a fiber laser, however, due to the light confinement characteristics in a fiber, the ASE signal is confined within the fiber and is, in fact, amplified more efficiently than the laser pulses, due to the following two reasons.

First, the pump laser diode is running in a continuous wave (cw) mode while the produced laser beam is Q-switched or mode-locked into nanosecond (ns), picosecond (ps), or femtosecond (fs) pulses. With a repetition rate between one MHz to few hundreds MHz, the present of the laser beam is very short in time. In another expression, the duty cycle of the laser beam is very small. Accordingly, during most of the time that the pump laser diode is on and pumping, the ASE is the only signal present in the fiber.

Second, in the fiber amplifier, the small signal gain is much higher than the large signal gain due to the gain saturation effect. When the high power laser pulses are present in the fiber, its gain is smaller than that of the lower power but constantly present ASE signal.

Embodiments that reduce the number of amplifier stages to reduce the cost of the fiber laser system, which are configured to filter out the ASE, are described in detail in the disclosure.

Figure 1:
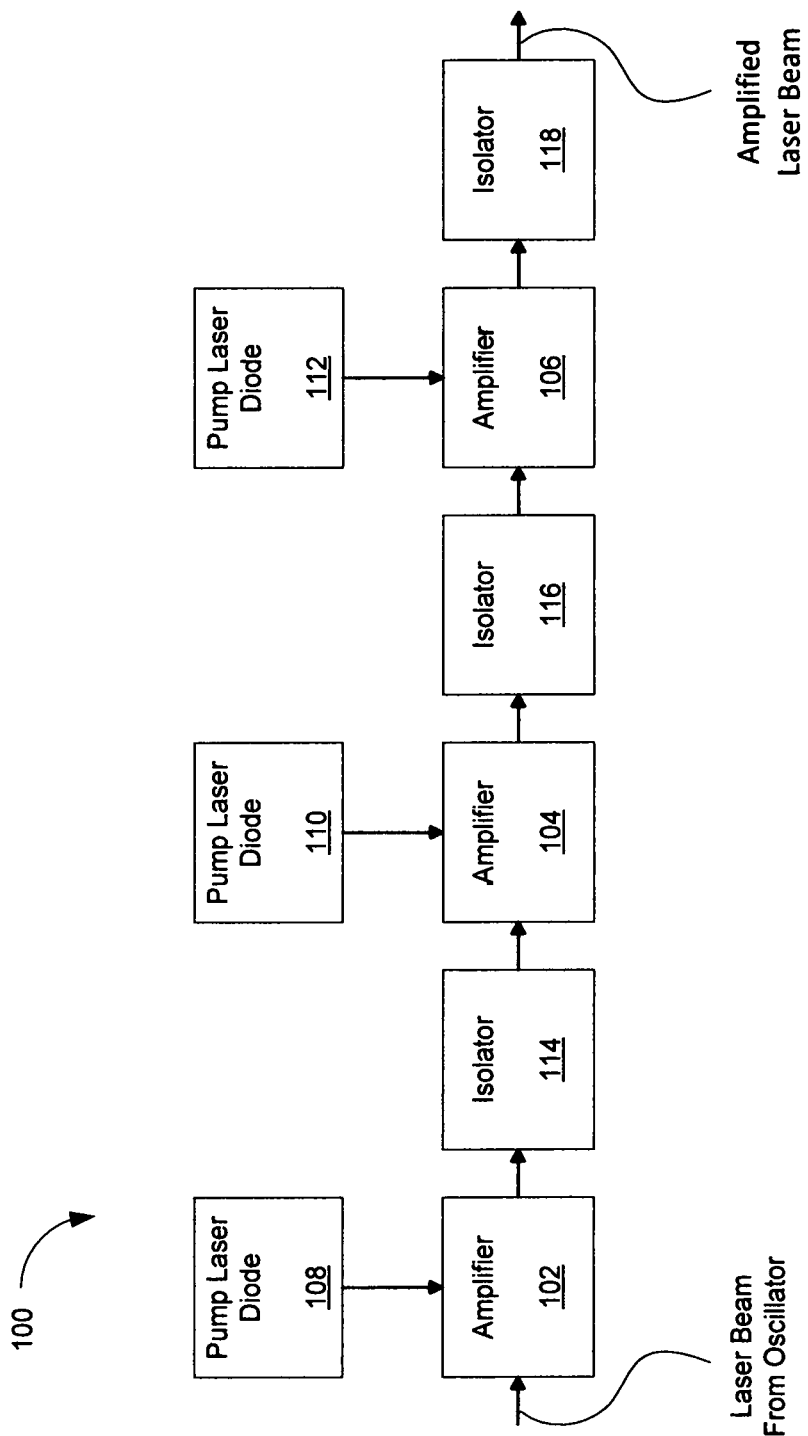
FIG. 1 shows a prior art fiber amplifier system.

There are three approaches to filter out the ASE, in the spectral domain, the temporal domain, and the spatial domain. In the first exemplary approach, a notch filter, which is a narrow spectral pass-band filter, may be placed in between two amplifier stages (e.g., amplifier 102 and amplifier 104 of FIG. 1) to block the ASE. The filter passes the laser beam having a narrow bandwidth and blocks the ASE outside the laser bandwidth. The notch filter may be a dielectric thin film filter, a fiber Bragg grating, or a waveguide Bragg grating.

In the second exemplary approach, a spatial filter may be placed in between two amplifier stages (e.g., amplifier 102 and amplifier 104 of FIG. 1) to block the ASE. A configuration comprises a lens for focusing the laser beam. A pinhole (spatial filter) is placed at the focal plane of the lens to let the focused laser beam passing through the pinhole, while the ASE is not focused and is blocked. The laser beam after passing the pinhole is again collimated.

In the third exemplary approach, a time gated temporal filter, which is synchronized with the laser pulses, may be placed in between two amplifier stages (e.g., amplifier 102 and amplifier 104 of FIG. 1) to block the ASE. The temporal filter may be an optical switch, an acousto-optical switch or modulator, an electro-optical switch or modulator, or any device based on mechanism that is switched closed when laser pulses are absent and switched open when laser pulses are present.

Figure 2:
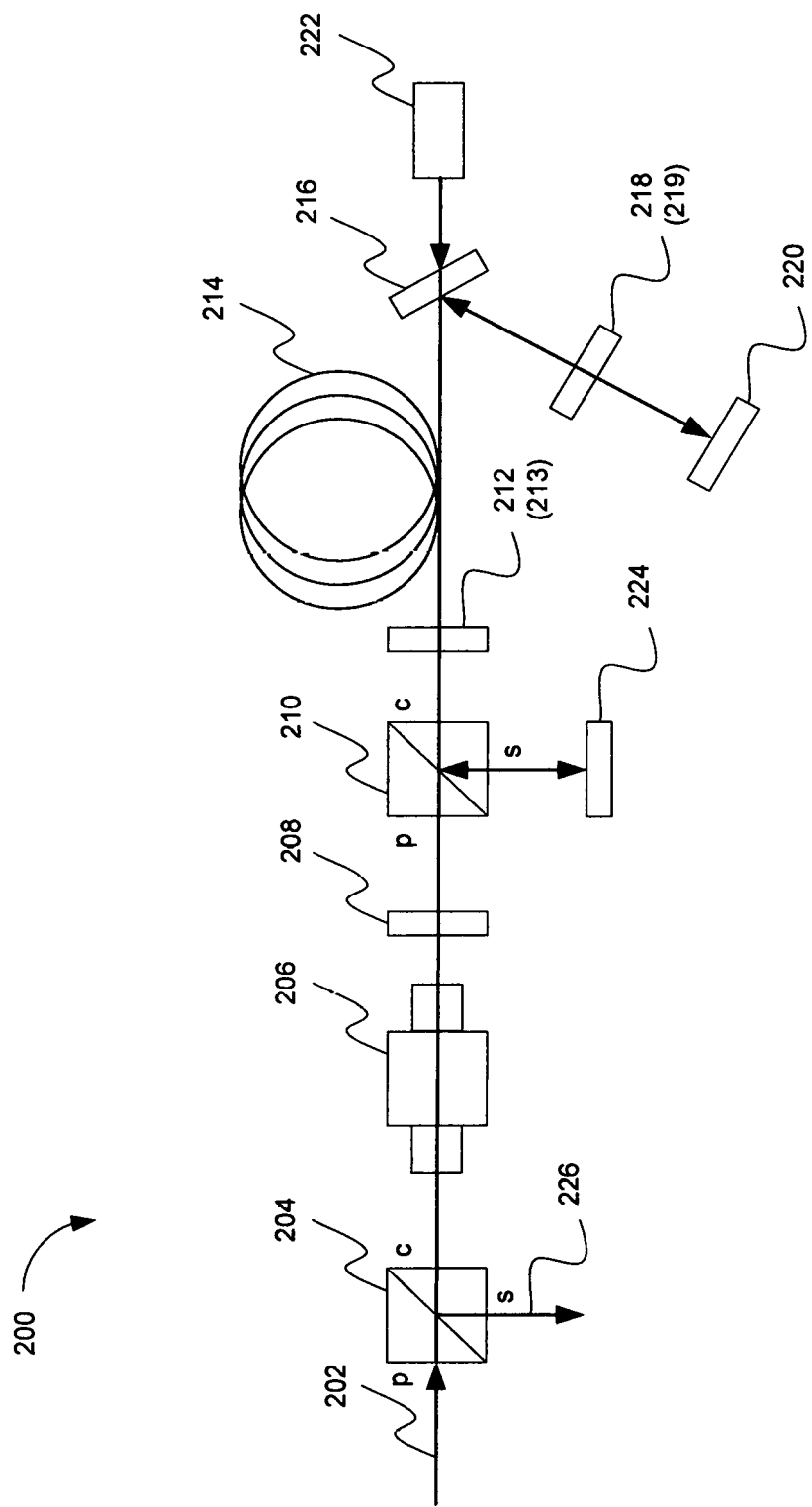
FIG. 2 illustrates an exemplary embodiment of multipass fiber amplifier.

FIG. 2 illustrates an exemplary embodiment of multipass fiber amplifier 200, according to the present invention. Embodiment 200 routes an amplified laser beam in a gain fiber for multipass amplification. A p-polarized laser beam 202 from an oscillator (not shown) enters a first polarization separating device (PSD) 204. A PSD separates an input light into two output lights having orthogonal linear polarizations. A PSD includes a cube polarizing beam splitter (PBS), a fiber polarization beam combiner/splitter, and any device that can separate an input light into two output lights having orthogonal linear polarizations. First PSD 204 is aligned such that the p-polarized laser beam transmits through first PSD 204. After leaving first PSD 204, the p-polarized laser beam enters a first Faraday rotator 206. First Faraday rotator 206 rotates the polarization of the p-polarized laser beam by 45°. After leaving first Faraday rotator 206, the 45° rotated p-polarized laser beam passes through a half-wave plate (HWP) 208. HWP 208 is aligned such that an optical axis of HWP 208 forms a −22.5° angle with the polarization of the 45° rotated p-polarized laser beam. Accordingly, after leaving HWP 208, the polarization of the laser beam is rotated 2×(−22.5°) or −45°, so the polarization of the laser beam after leaving HWP 208 is the same as the polarization of p-polarized laser beam 202 before entering first PSD 204. After leaving HWP 208, the p-polarized laser beam enters a second PSD 210. Similar to first PSD 204, second PSD 210 is aligned such that the p-polarized laser beam transmits through second PSD 210.

A first mirror 224 is configured to reflect an s-polarized laser beam, which is reflected by second PSD 210 toward first mirror 224, as will be described later.

Figure 3:
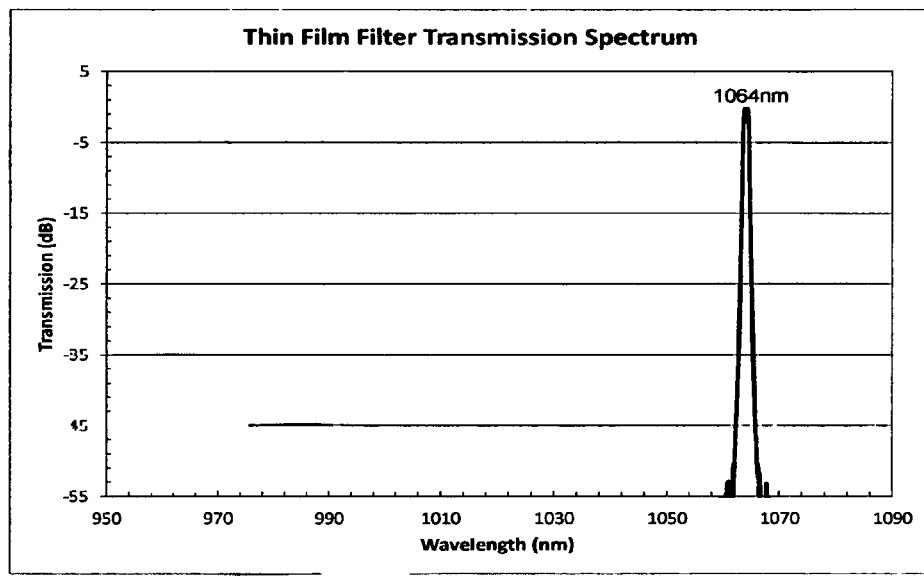
FIG. 3 illustrates a transmission spectrum of a notch filter.
Figure 4:
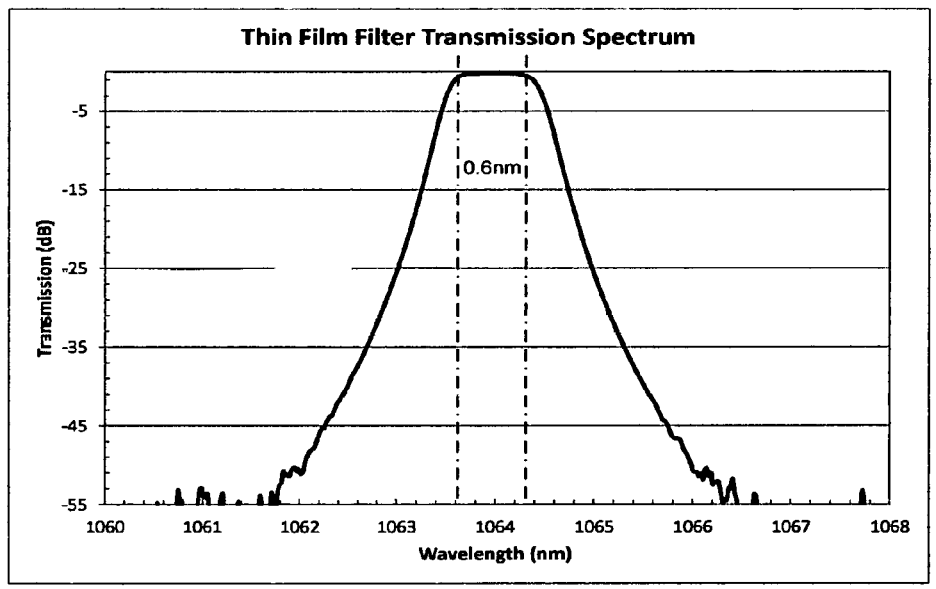
FIG. 4 illustrates the detail of the transmission spectrum of the notch filter of FIG. 3.

After leaving second PSD 210, the p-polarized laser beam passes through an ASE blocking device 213, which may be a notch filter 212. ASE blocking device 213 may be a spatial filter or a time gated temporal filter as well. For example, a transmission spectrum of notch filter 212 is illustrated in FIG. 3, according to the present invention. FIG. 4 illustrates the detail of transmission spectrum of FIG. 3, according to the present invention. In the example shown, it is appreciated that only light having wavelengths within a bandwidth 0.6 nm centered at 1064 nm may transmit through notch filter 212. Accordingly, the ASE included in the laser beam is blocked by notch filter 212 from propagating to a gain fiber 214, since the ASE is not coherent and has a broad spectral bandwidth. However, the laser beam having center wavelength 1064 nm and bandwidth smaller than 0.6 nm transmits through notch filter 212 and enters gain fiber 214 for the first time. It is appreciated that notch filters having different center wavelengths and different bandwidths are possible.

After passing gain fiber 214 for the first time, the p-polarized laser beam is incident on a dichroic filter 216, which may be a dielectric thin film filter. A dichroic filter may accurately selectively transmit light of a small range of wavelengths while reflect light of other wavelengths. Similarly, a dichroic filter may accurately selectively reflect light of a small range of wavelengths while transmit light of other wavelengths. In the embodiment shown, dichroic filter 216 selectively reflects the p-polarized laser beam to a quarter-wave plate (QWP) 218.

The p-polarized laser beam passes through QWP 218 and is directed to a second mirror 220. QWP 218 changes the polarization of the p-polarized laser beam, which is linearly polarized to circularly polarized. After being reflected by second mirror 220, the laser beam is reversed-circularly polarized, and passes through QWP 218 for the second time. QWP 218, in turn, changes the reversed-circular polarization to linear polarization. However, the linear polarization is rotated 90° referring to the originally incoming p-polarized laser beam. Thus, after leaving QWP 218, the incoming p-polarized laser beam becomes the reflected s-polarized laser beam. The s-polarized laser beam is directed to and reflected by dichroic filter 216. In the embodiment shown, dichroic filter 216 selectively reflects the s-polarized laser beam back to gain fiber 214. The laser beam enters gain fiber 214 for the second time.

It is appreciated that QWP 218 and mirror 220 may be replaced by any 90° polarization rotating beam reflector, including a second Faraday rotator 219 and mirror 220. Second Faraday rotator 219 may rotate the polarization of a transmitted light by 45°. Since a Faraday rotator is invariant to the light propagating direction, second Faraday rotator 219 may rotate again the polarization by 45° when the light is reflected through it. A 90° polarization rotating beam reflector reflects the incoming laser beam and rotates the polarization of the reflected laser beam by 90°.

A pump source 222, which may be a laser diode or a light emitting diode (LED), emits a pump light. Pump source 222 may be a single pump source or may be a plurality of pump sources that are combined. A partial power from an individual pump source may play a different function via a power splitter. The pump light is directed to dichroic filter 216 from an opposite direction to the direction of the p-polarized laser beam, and enters gain fiber 214 as shown in FIG. 2. Since the pump light does not include wavelengths of the laser beam, it is not reflected by dichroic filter 216. Typically, the wavelength of the pump light is shorter than the wavelength of the laser beam. The pump light transmits through dichroic filter 216, and it is combined with the laser beam reflected by dichroic filter 216. The combination of the laser beam and the pump light enter gain fiber 214. The laser beam is amplified by the pump light in gain fiber 214.

After passing gain fiber 214 for the second time, the pump light and the ASE are blocked by notch filter 212, while the s-polarized laser beam transmits through notch filter 212 and enters second PSD 210. The s-polarized laser beam is reflected by second PSD 210 toward first mirror 224. The laser beam is reflected by first mirror 224 back to second PSD 210. First mirror 224 may be a fiber pigtail mirror. The s-polarized laser beam is reflected again by second PSD 210 and directed to transmit through notch filter 212 and enters gain fiber 214 for the third time.

After passing gain fiber 214 for the third time, the s-polarized laser beam is reflected by dichroic filter 216, passing through QWP 218, reflected by second mirror 220, and passing through QWP 218 for the second time. After passing QWP 218 for the second time, the s-polarized laser beam becomes p-polarized laser beam. The p-polarized laser beam is further reflected by dichroic filter 216, and directed to enter gain fiber 214 for the fourth time. As described previously, QWP 218 may be replaced by second Faraday rotator 219.

After passing gain fiber 214 for the fourth time, the p-polarized laser beam transmits through notch filter 212 and second PSD 210 arriving at HWP 208. The p-polarized laser beam is coming from an opposite direction (e.g., from right to left) to the first passage (e.g., from left to right), accordingly, the polarization of the p-polarized laser beam is rotated by HWP 208 by 45°. The polarization of the laser beam would be rotated by HWP 208 by −45° if the laser beam is coming from the same direction as the first passage (e.g., from left to right). After leaving HWP 208, the 45° polarization rotated p-polarized laser beam enters first Faraday rotator 206. Since a Faraday rotator is invariant to the light propagating direction, first Faraday rotator 206 rotates the polarization of the laser beam again by 45°, so the laser beam becomes s-polarized laser beam. The s-polarized laser beam is reflected by first PSD 204, which is an amplified laser beam 226. Amplified laser beam 226 may be coupled to an output fiber (not shown).

Figure 5:
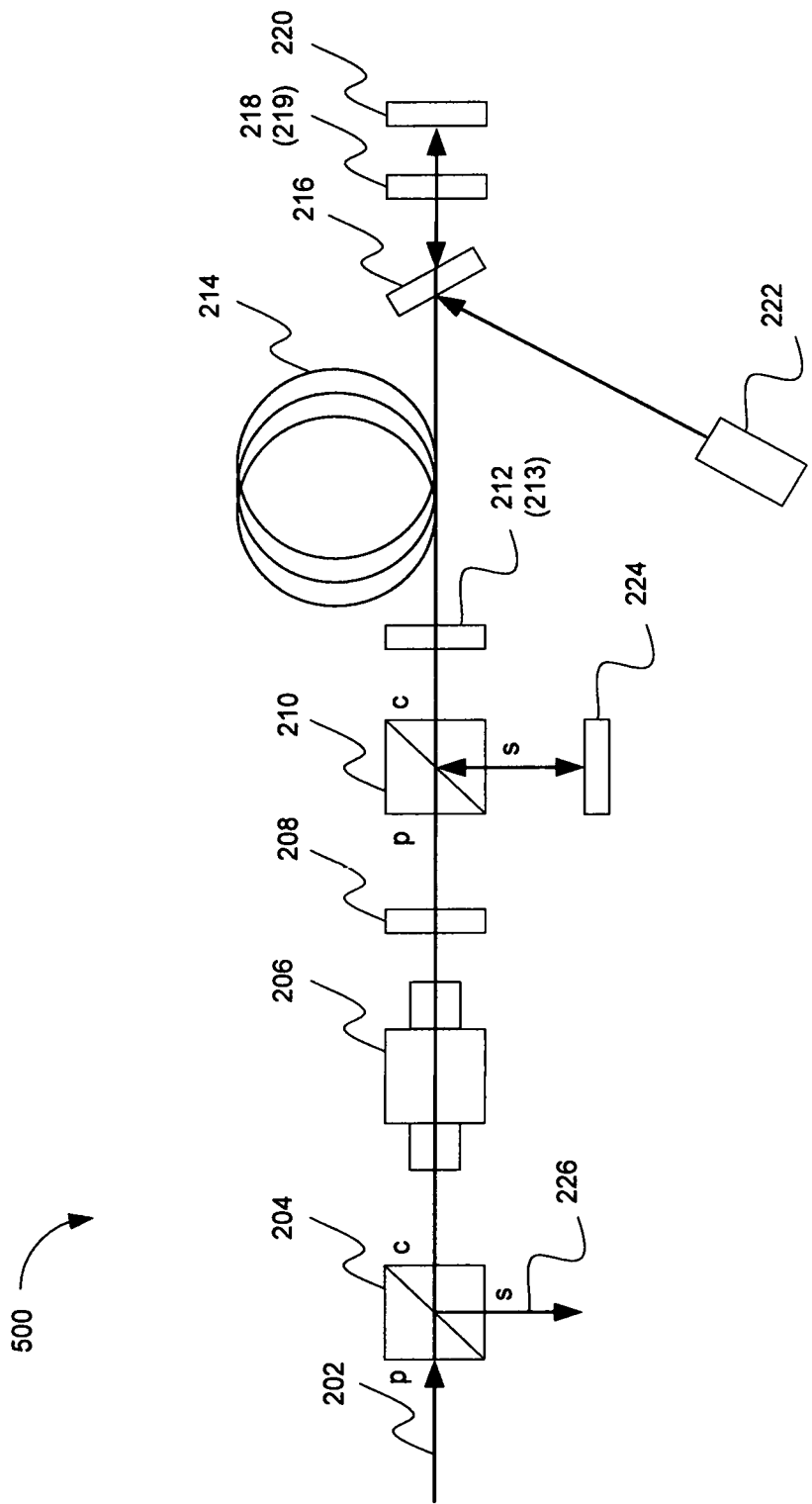
FIG. 5 illustrates another exemplary embodiment of multipass fiber amplifier.

FIG. 5 illustrates another exemplary embodiment of multipass fiber amplifier 500, according to the present invention. Embodiment 500 similarly routes an amplified laser beam in a gain fiber for multipass amplification. FIG. 5 is essentially the same as FIG. 2. The difference between FIG. 5 and FIG. 2 is as follow. After passing gain fiber 214 for the first time, the p=polarized laser beam passes through dichroic filter 216 and QWP 218, which changes the p-polarized laser beam to a circularly polarized laser beam. In the embodiment shown, dichroic filter 216 transmits the p-polarized laser beam to QWP 218. After passing through QWP 218, the circularly polarized laser beam arrives at a second mirror 220. The laser beam reflected by second mirror 220 becomes reversed-circularly polarized. The reflected reversed-circularly polarized laser beam passes through QWP 218 for the second time. QWP 218, in turn, changes the reversed-circular polarization to linear polarization. However, the linear polarization is rotated 90° referring to the originally incoming p-polarized laser beam. Thus, after leaving QWP 218, the incoming p-polarized laser beam becomes the reflected s-polarized laser beam. After passing through dichroic filter 216, the laser beam enters gain fiber 214 for the second time. It is appreciated that QWP 218 and mirror 220 may be replaced by any 90° polarization rotating beam reflector, including second Faraday rotator 219 and mirror 220. A 90° polarization rotating beam reflector reflects the incoming laser beam and rotates the polarization of the reflected laser beam by 90°.

A pump source 222, which may be a laser diode or a light emitting diode (LED), emits a pump light. The pump light is directed to dichroic filter 216 obliquely. In the embodiment shown, dichroic filter 216 selectively reflects the pump light toward gain fiber 214. The pump light reflected by dichroic filter 216 is combined with the laser beam transmitted through dichroic filter 216. The combination of the laser beam and the pump light enters gain fiber 214. The laser beam is amplified by the pump light in gain fiber 214.

Figure 6:
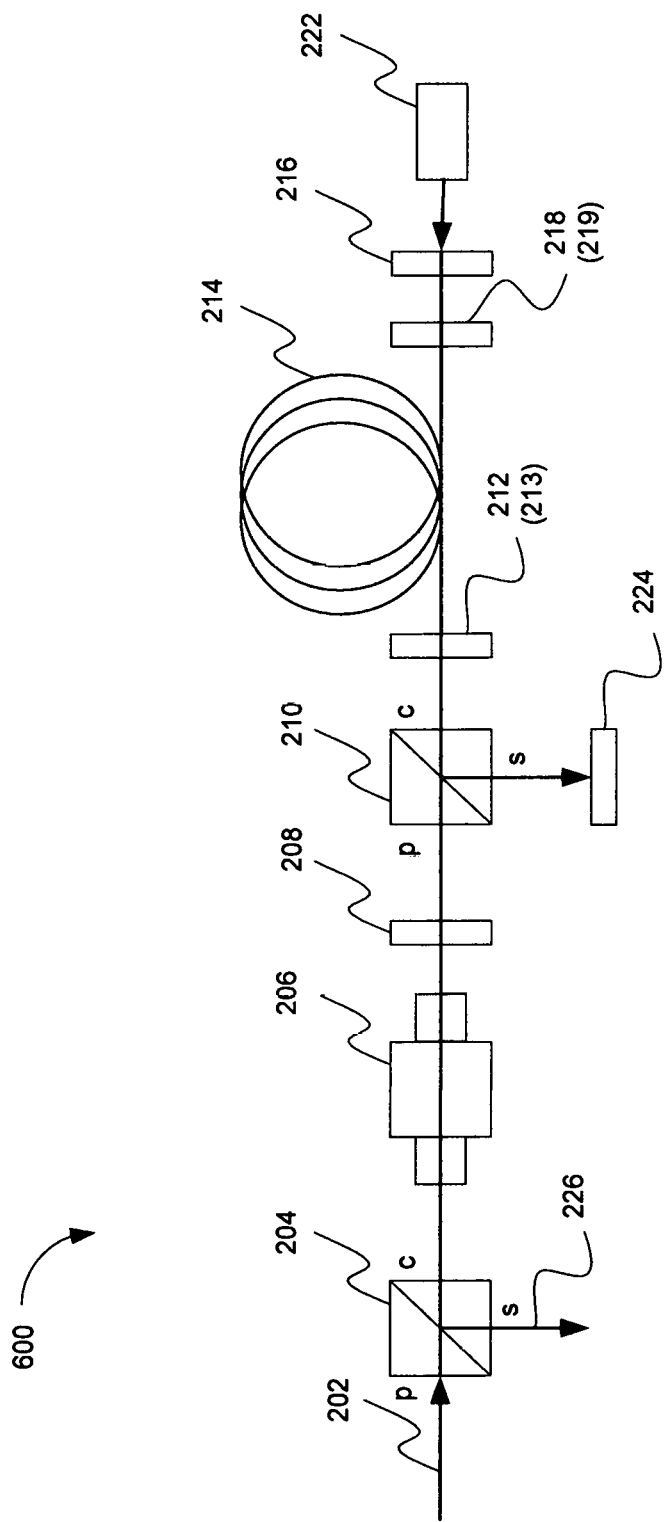
FIG. 6 illustrates yet another exemplary embodiment of multipass fiber amplifier.

FIG. 6 illustrates yet another exemplary embodiment of multipass fiber amplifier 600, according to the present invention. Embodiment 600 similarly routes an amplified laser beam in a gain fiber for multipass amplification. FIG. 6 is essentially the same as FIG. 2. The difference between FIG. 6 and FIG. 2 is as follow. After passing gain fiber 214 for the first time, the p-polarized laser beam passes through QWP 218, which changes the p-polarized laser beam to a circularly polarized laser beam. The circularly polarized laser beam arrives at dichroic filter 216. In the embodiment shown, dichroic filter 216 selectively normally reflects the circularly polarized laser beam back to QWP 218. The reflected laser beam becomes reversed-circularly polarized. The reflected reversed-circularly polarized laser beam passes through QWP 218 for the second time. QWP 218, in turn, changes the reversed-circular polarization to linear polarization. However, the linear polarization is rotated 90° referring to the originally incoming p-polarized laser beam. Thus, after leaving QWP 218, the incoming p-polarized laser beam becomes the reflected s-polarized laser beam. The laser beam enters gain fiber 214 for the second time.

It is appreciated that QWP 218 may be replaced by second Faraday rotator 219. After passing gain fiber 214 for the first time, the p-polarized laser beam passes through second Faraday rotator 219, which rotates the polarization of the p-polarized laser beam by 45°. The 45° rotated polarization laser beam arrives at dichroic filter 216. Dichroic filter 216 selectively normally reflects the 45° rotated polarization laser beam back to second Faraday rotator 219. The polarization of the reflected laser beam is rotated again by 45°, such that the linear polarization is rotated 90° referring to the originally incoming p-polarized laser beam. Thus, after leaving second Faraday rotator 219, the incoming p-polarized laser beam becomes the reflected s-polarized laser beam. The laser beam enters gain fiber 214 for the second time.

A pump source 222, which may be a laser diode or a light emitting diode (LED), emits a pump light. The pump light is directed to dichroic filter 216 from an opposite direction to the direction of the laser beam, and to gain fiber 214 as shown in FIG. 6. Since the pump light does not include wavelengths of the laser beam, it is not reflected by dichroic filter 216. The pump light transmits through dichroic filter 216, and it is combined with the laser beam reflected by dichroic filter 216. In this embodiment, the polarization of the pump light will be altered by QWP 218 or second Faraday rotator 219, but the light path of pump light will not change. The combination of the laser beam and the pump light enter gain fiber 214. The laser beam is amplified by the pump light in gain fiber 214.

Accordingly, the laser beam passes through the same gain fiber 214 four times. Each time the laser beam passes through gain fiber 214, it transmits through notch filter 212 to filter out the ASE. Needless to say, notch filters 212 may be replaced by a spatial filter or a time gated temporal filter as described previously.

Figure 7:
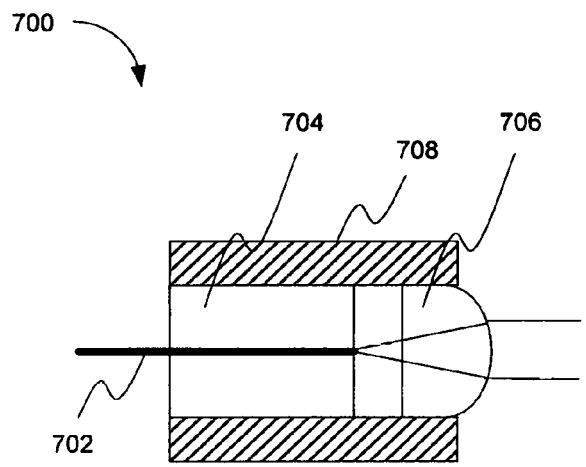
FIG. 7 illustrates an exemplary embodiment of fiber collimator.

Two ends of gain fiber 214 may include two fiber collimators, respectively. FIG. 7 illustrates an exemplary embodiment of fiber collimator 700, according to the present invention. An end of gain fiber 214 is coupled to fiber collimator 700. A light beam enters a fiber 702 mounted in a capillary tube 704. Fiber 702 may be coupled to gain fiber 214. The light beam is collimated by a lens 706 and exit from fiber collimator 700. Capillary tube 704 and lens 706 may be enclosed in a cylindrical tube 708. Inversely, a collimated light beam may enter from lens 706. The collimated light beam may be focused by lens 706 and exit from fiber 702.

A fiber collimator 700 may be disposed between pump source 222 and dichroic filter 216. In an embodiment, fiber 702 is coupled to pump source 222 outputting a collimated light beam from lens 706 to dichroich filter 216.

Figure 8:
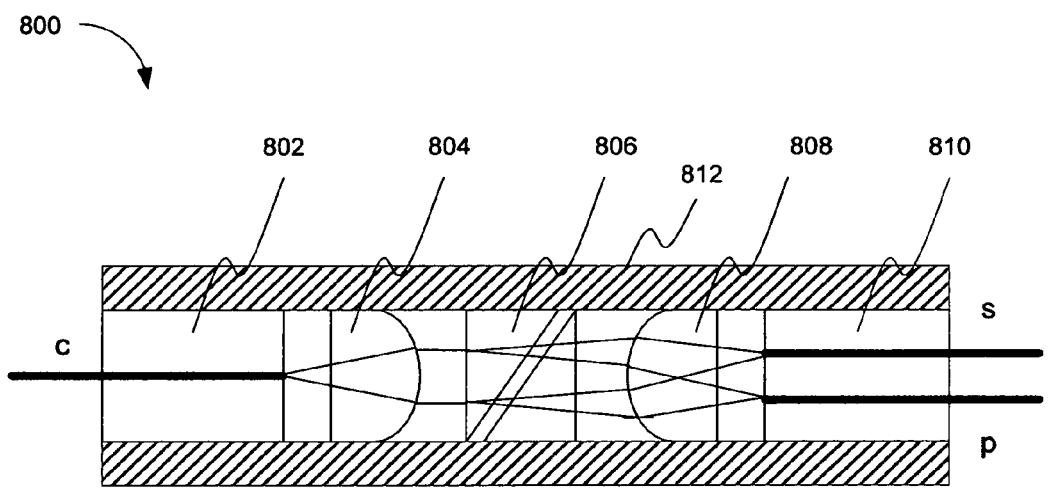
FIG. 8 illustrates an exemplary embodiment of polarization separating device (PSD).

FIG. 8 illustrates an exemplary embodiment of fiber polarization beam combiner/splitter (FPBCS) 800, which may be first PSD 204 or second PSD 210 of FIG. 2, according to the present invention. FPBCS 800 comprises a c-port (common port) fiber, s-port (s-polarization port) fiber, p-port (p-polarization port) fiber, and a Wollaston prism pair 806. The incoming light enters from c-port fiber mounted in a first capillary tube 802. The incoming light is collimated by a first lens 804. The collimated beam impinges on Wollaston prism pair 806, which separate the incoming collimated beam into a collimated s-polarized beam and a collimated p-polarized beam. The collimated s-polarized and p-polarized beams are focused by a second lens 808 and coupled to s-port fiber and p-port fiber, respectively, which are mounted in a second capillary tube 810. First capillary tube 802, first lens 804, Wollaston prism pair 806, second lens 808, and second capillary tube 810 may be enclosed in a cylindrical tube 812.

For a s-polarized light entering from the s-port fiber mounted in second capillary tube 810, the s-polarized light is collimated by second lens 808 becoming a collimated s-polarized beam. For a p-polarized light entering from the p-port fiber mounted in second capillary tube 810, the p-polarized light is collimated by second lens 808 becoming a collimated p-polarized beam. The incoming light is collimated by a first lens 804. The collimated beam impinges on the collimated s-polarized beam and the collimated p-polarized beam are combined by Wollaston prism pair 806 becoming a collimated combined beam having s-polarized light and p-polarized light. The collimated combined beam is focused by first lens 804 and coupled to c-port fiber, which is mounted in first capillary tube 802.

Figure 9:
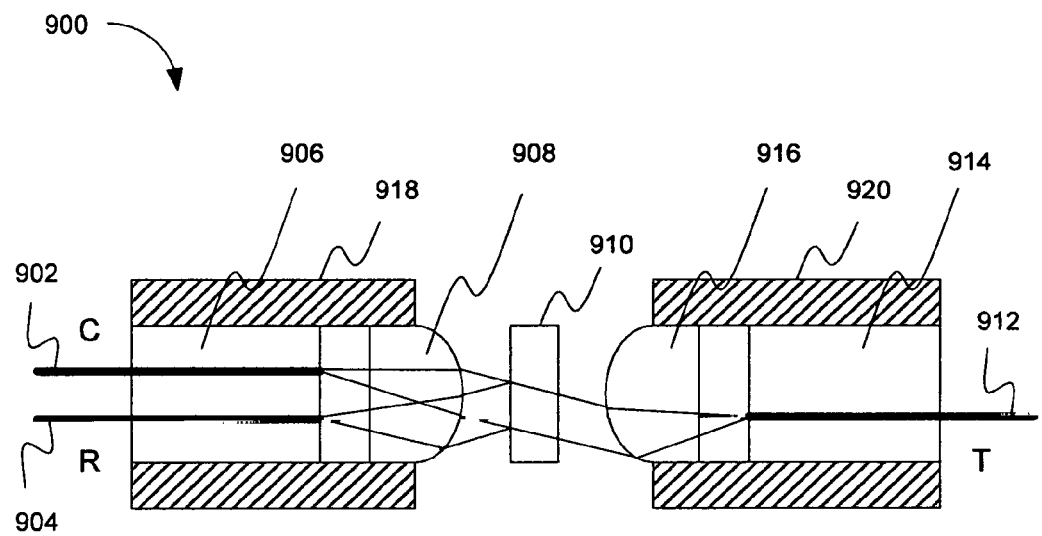
FIG. 9 illustrates an exemplary embodiment of wavelength-division multiplexer (WDM).

Dichroic filter 216 of FIG. 2 may be included in a wavelength-division multiplexer (WDM). FIG. 9 illustrates an exemplary WDM 900 including a dichroic filter 910, according to the present invention. For example, for the embodiment shown in FIG. 2, a laser beam exiting from gain fiber 214 may enter a C-port (Common port) fiber 902. C-port fiber and an R-port (Reflection port) fiber 904 are mounted in a first capillary tube 906. The laser beam is collimated by a first lens 908. The collimated laser beam is directed to dichroic filter 910, which may be a dielectric thin film filter. Dichroic filter 910 is configured to selectively reflect the incoming collimated laser beam having wavelengths in a specific reflected wavelength range. The reflected collimated laser beam is focused by first lens 908 and coupled to R-port fiber 904. Laser beam exiting from R-port fiber 804 passes through QWP 218 of FIG. 2, is reflected by second mirror 220 of FIG. 2, and re-enters R-port fiber 904. The laser beam re-entering R-port fiber 908 is reflected by dichroic filter 910 to C-port fiber 902.

A pump light enters a T-port (Transmission port) fiber 912 mounted in a second capillary tube 914. The pump light is collimated by a second lens 916. The collimated pump light is directed to dichroic filter 910. Since the wavelength of the pump light is not in the specific reflected wavelength range, dichroic filter 910 transmits the incoming collimated pump light. The transmitted pump light is configured to coincide with the reflected collimated laser beam. The coinciding laser beam and pump light are focused by first lens 908 and coupled to C-port fiber 902. The combined laser beam and pump light exit from C-port fiber. First capillary tube 906 and first lens may be enclosed in a first cylindrical tube 918. Second capillary tube 914 and second lens 916 may be enclosed in a second cylindrical tube 920.

Figure 9A:
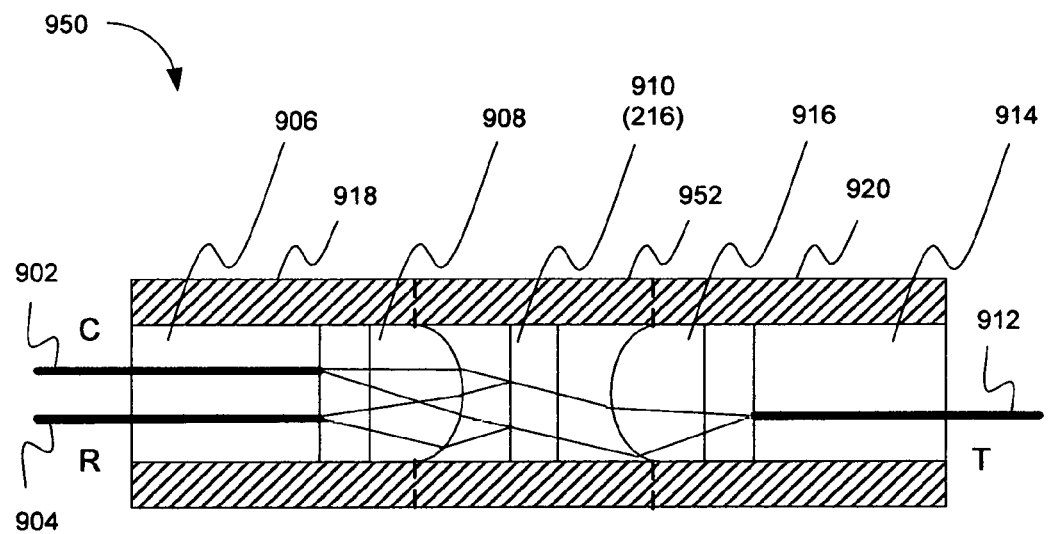
FIG. 9A illustrates another exemplary embodiment of wavelength-division multiplexer (WDM).

In an embodiment, a micro-optic-module WDM 950 having C-port fiber 902, R-port fiber 904, and T-port fiber 912, comprising a single cylindrical tube 952 including first cylindrical tube 918 and second cylindrical tube 920, is illustrated in FIG. 9A, according to the present invention. Single cylindrical tube 952 encloses dichroic filter 910. Dichroic filter 910 may be dichroic filter 216 of FIG. 2 or FIG. 5.

In embodiments of FIG. 2 and FIG. 5, a WDM having three fibers corresponding to R-port, C-port, and T-port may be used. However, in an embodiment of FIG. 6, dichroic filter 910 normally reflects the laser beam, such that only a fiber is used for both R-port fiber and C-port fiber. R-port fiber and C-port fiber are merged into a single fiber, which is disposed at the optical axis of first lens 908. Similarly, T-port fiber is disposed at the optical axis of second lens 916. Accordingly, a WDM having two fibers may be used for the embodiment of FIG. 6.

Figure 10:
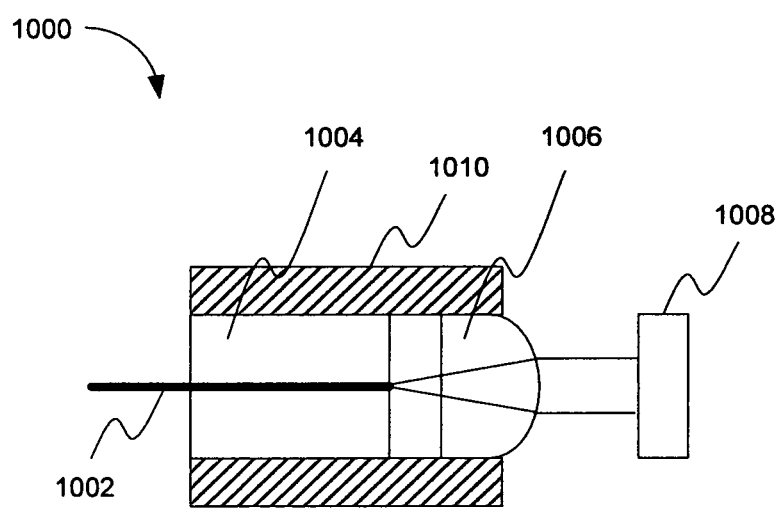
FIG. 10 illustrates an exemplary embodiment of fiber pigtail mirror.

FIG. 10 illustrates an exemplary embodiment of fiber pigtail mirror 1000 comprising a fiber 1002 and a collimating lens 1006, which may include first mirror 224 of FIG. 2, according to the present invention. A linearly polarized light enters fiber 1002 mounted in a capillary tube 1004. The incoming linearly polarized light is collimated by lens 1006 and reflected by a mirror 1008, which may be first mirror 224 of FIG. 2. The polarization of the linearly polarized light is not changed when it is reflected by mirror 1008. The linearly polarized light is output from the same fiber 1002 after it is focused by lens 1006. Capillary tube 1004 and lens 1006 may be enclosed in a cylindrical tube 1010. In an embodiment, mirror 1008 may also be included in cylindrical tube 1010.

Figure 11:
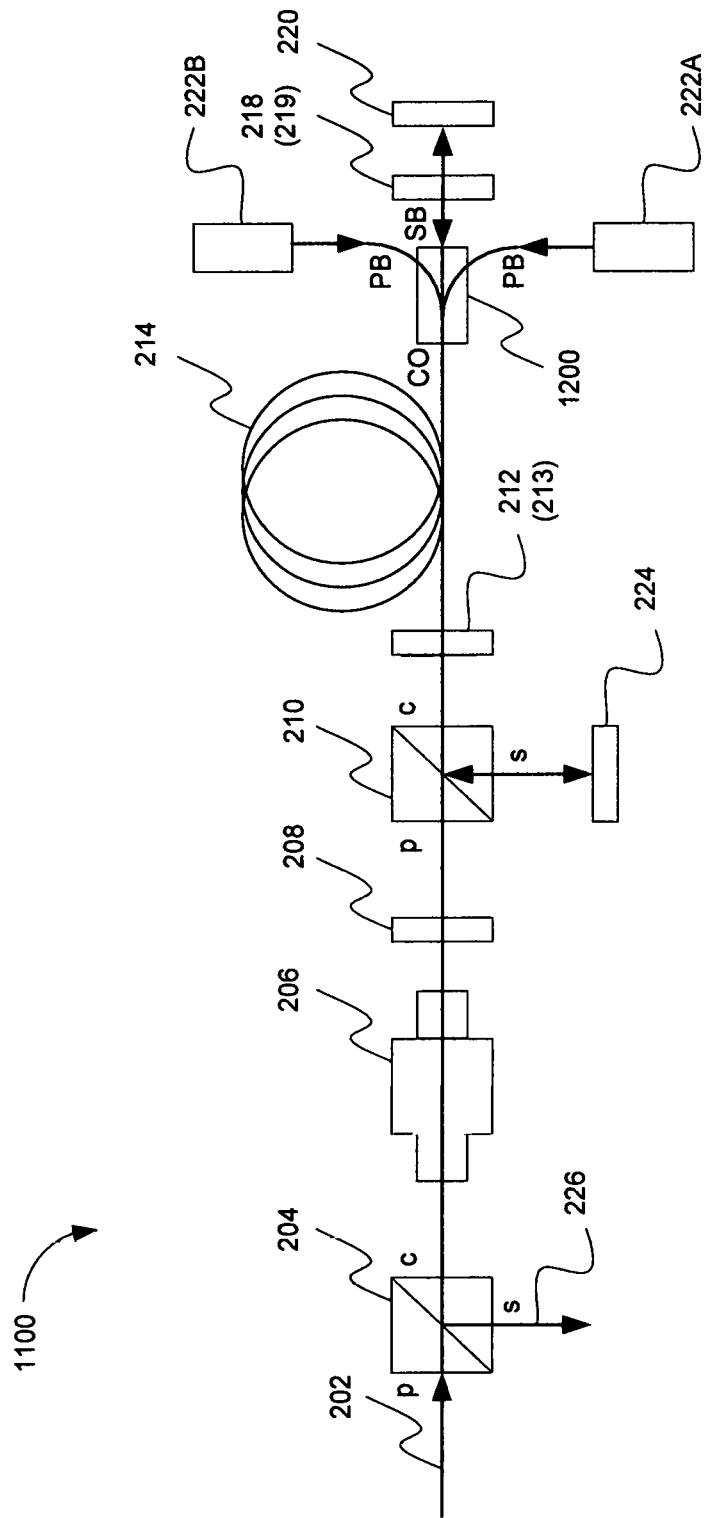
FIG. 11 illustrates further another exemplary embodiment of multipass fiber amplifier.

FIG. 11 illustrates further another exemplary embodiment of multipass fiber amplifier 1100, according to the present invention. Embodiment 1100 similarly routes an amplified laser beam in a gain fiber for multipass amplification. FIG. 11 is essentially the same as FIG. 5. The difference between FIG. 11 and FIG. 5 is as follow. Dichroic filter 216 is replaced with a fiber combiner 1200. For example, a commercially available fiber combiner manufactured by ITF Labs., Inc., Canada (www.3spgroup.com) may be used.

Figure 12:
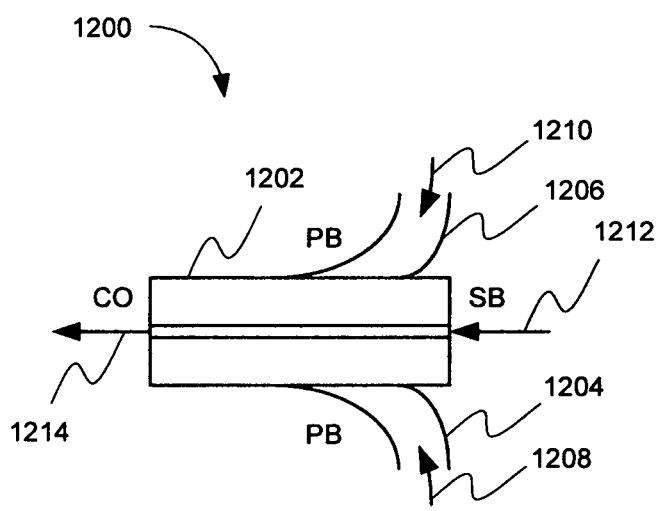
FIG. 12 illustrates an exemplary embodiment of fiber combiner.

An exemplary fiber combiner 1200 is illustrated in FIG. 12, according to the present invention. Fiber combiner 1200 comprises a main fiber 1202, which is fused with fibers 1204 and 1206. Needless to say, main fiber 1202 can be fused with a plurality of fibers and at least one fiber. Main fiber 1202 may be a double clad fiber (DCF). A laser beam 1212 is input from SB (signal beam) port. Pump light beams 1208 and 1210 are input from PB (pump beam) port. The combined output of laser beam and pump light is output from CO (combined output) port. At least a pump source provides the pump light.

In embodiment 1100 of FIG. 11, after passing gain fiber 214 for the first time, the p-polarized laser beam enters fiber combiner 1200 from CO port and exits from SB port toward QWP 218. QWP 218 changes the p-polarized laser beam to a circularly polarized laser beam. After passing through QWP 218, the circularly polarized laser beam arrives at a second mirror 220. The laser beam reflected by second mirror 220 becomes reversed-circularly polarized. The reflected reversed-circularly polarized laser beam passes through QWP 218 for the second time. QWP 218, in turn, changes the reversed-circular polarization to linear polarization. However, the linear polarization is rotated 90° referring to the originally incoming p-polarized laser beam. Thus, after leaving QWP 218, the incoming p-polarized laser beam becomes the reflected s-polarized laser beam. It is appreciated that QWP 218 and mirror 220 may be replaced by any 90° polarization rotating beam reflector, including a second Faraday rotator and a mirror. A 90° polarization rotating beam reflector reflects the incoming laser beam and rotates the polarization of the reflected laser beam by 90°.

The s-polarized laser beam enters fiber combiner 1200 from SB port. The pump light beams from pump sources 222A and 222B enter from PB ports. The combined laser beam and pump light exits from CO port, and enters gain fiber 214 for the second time. The pump sources are not limited to two. For example, a six-pump-source-one-signal fiber combiner (6+1×1) manufactured by ITF Labs., Inc. (www.3spgroup.com), may be used. Accordingly, the laser beam will pass through the same gain fiber 214 four times as described previously.

All fibers included in an embodiment, including gain fiber 214, may be polarization maintaining fibers, regular fibers, or any type of fibers.

Figure 13:
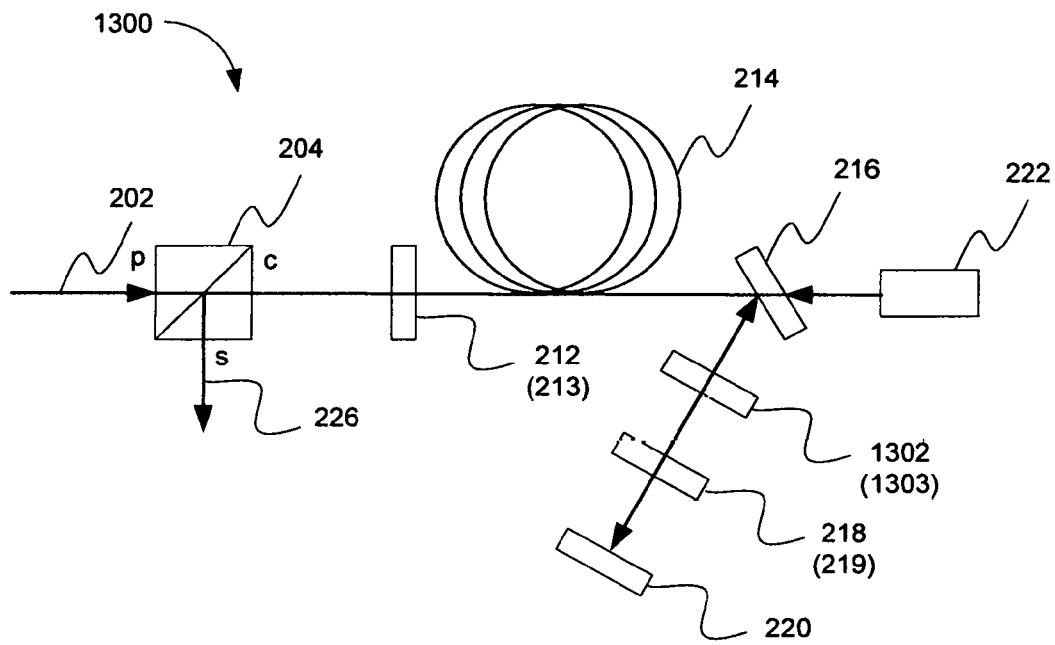
FIG. 13 illustrates an exemplary embodiment of multipass fiber amplifier comprising two ASE blocking devices coupled to two ends of a gain fiber.

FIG. 13 illustrates an exemplary embodiment of multipass fiber amplifier 1300, according to the present invention. Embodiment 1300 routes an amplified laser beam in a gain fiber for multipass amplification. A p-polarized laser beam 202 from an oscillator (not shown) enters a polarization separating device (PSD) 204. A PSD separates an input light into two output lights having orthogonal linear polarizations (p-polarization and s-polarization). A PSD includes a cube polarizing beam splitter (PBS), a fiber polarization beam combiner/splitter, and any device that can separate an input light into two output lights having orthogonal linear polarizations. PSD 204 is aligned such that the p-polarized laser beam transmits through PSD 204. PSD 204 will reflects s-polarized light.

After leaving PSD 204, the p-polarized laser beam passes through a first ASE blocking device 213, which may be a first notch filter 212. First ASE blocking device 213 may be a spatial filter or a time gated temporal filter as well. For example, a transmission spectrum of first notch filter 212 is illustrated in FIG. 3, according to the present invention. FIG. 4 illustrates the detail of transmission spectrum of FIG. 3, according to the present invention. In the example shown, it is appreciated that only light having wavelengths within a bandwidth 0.6 nm centered at 1064 nm may transmit through first notch filter 212. Accordingly, the ASE included in the laser beam is blocked by first notch filter 212 from propagating to a gain fiber 214, since the ASE is not coherent and has a broad spectral bandwidth. However, the laser beam having center wavelength 1064 nm and bandwidth smaller than 0.6 nm transmits through first notch filter 212 and enters a first end of gain fiber 214 for the first time. It is appreciated that notch filters having different center wavelengths and different bandwidths are possible. First ASE blocking devise 213 is coupled to the first end of gain fiber 214.

After passing gain fiber 214 for the first time, the p-polarized laser beam is leaving a second end of gain fiber 214 incident on a dichroic filter 216, which may be a dielectric thin film filter. A dichroic filter may accurately selectively transmit light of a small range of wavelengths while reflect light of other wavelengths. Similarly, a dichroic filter may accurately selectively reflect light of a small range of wavelengths while transmit light of other wavelengths. In the embodiment shown, dichroic filter 216 selectively reflects the p-polarized laser beam leaving the second end of gain fiber 214.

The reflected laser beam, which is coming from the second end of gain fiber 214, is directed toward a second ASE blocking device 1303, which may be a second notch filter 1302. Second ASE blocking devise 1303 is coupled to the second end of gain fiber 214. Second notch filter 1302 may be identical to first notch filter 212. In an embodiment, second notch filter 1302 may be different from first notch filter 212. After passing second notch filter 1302, the p-polarized laser beam propagates toward a quarter-wave plate (QWP) 218.

The p-polarized laser beam passes through QWP 218 and is directed to a mirror 220. QWP 218 changes the polarization of the p-polarized laser beam, which is linearly polarized to circularly polarized. After being reflected by mirror 220, the laser beam is reversed-circularly polarized, and passes through QWP 218 for the second time. QWP 218, in turn, changes the reversed-circular polarization to linear polarization. However, the linear polarization is rotated 90° referring to the originally incoming p-polarized laser beam. Thus, after leaving QWP 218, the incoming p-polarized laser beam becomes the reflected s-polarized laser beam. The s-polarized laser beam is directed to second notch filter 1302. After passing second notch filter 1302 for the second time, the s-polarized laser beam is reflected by dichroic filter 216. In the embodiment shown, dichroic filter 216 selectively reflects the s-polarized laser beam back to gain fiber 214. The laser beam enters the second end of gain fiber 214 for the second time propagating in gain fiber 204.

In this manner, the ASE included in the laser beam is blocked twice by second notch filter 1302 from propagating in multipass fiber amplifier 1300, since the ASE is not coherent and has a broad spectral bandwidth. Second notch filter 1302 is coupled to the second end of gain fiber 214. For example, the laser beam having center wavelength 1064 nm and bandwidth smaller than 0.6 nm transmits through second notch filter 1302. It is appreciated that notch filters having different center wavelengths and different bandwidths are possible.

It is appreciated that QWP 218 and mirror 220 may be replaced by any 90° polarization rotating beam reflector, including a Faraday rotator 219 and mirror 220. Faraday rotator 219 may rotate the polarization of a transmitted light by 45°. Since a Faraday rotator is invariant to the light propagating direction, Faraday rotator 219 may rotate again the polarization by 45° when the light is reflected through it. A 90° polarization rotating beam reflector reflects the incoming laser beam and rotates the polarization of the reflected laser beam by 90°. For simplicity, 90° polarization rotating beam reflector is referred to as 90° polarization rotating reflector.

A pump source 222, which may be a laser diode or a light emitting diode (LED), emits a pump light. Pump source 222 may be a single pump source or may be a plurality of pump sources that are combined. Pump source 222 may be a fiber pigtailed light source comprising a light source, a focusing lens, and a fiber enclosed in a housing. A partial power from an individual pump source may play a different function via a power splitter. The pump light is directed to dichroic filter 216 from an opposite direction to the direction of the p-polarized laser beam, and enters gain fiber 214 as shown in FIG. 13. Since the pump light does not include wavelengths of the laser beam, it is not reflected by dichroic filter 216. Typically, the wavelength of the pump light is shorter than the wavelength of the laser beam. The pump light transmits through dichroic filter 216, and it is combined with the laser beam reflected by dichroic filter 216. The combination of the laser beam and the pump light enter the second end of gain fiber 214. The laser beam is amplified by the pump light in gain fiber 214.

After passing gain fiber 214 for the second time, the pump light and the ASE are blocked by first notch filter 212, while the s-polarized laser beam transmits through first notch filter 212 and enters PSD 204. In this manner, the ASE included in the laser beam is blocked twice by first notch filter 212 from propagating in multipass fiber amplifier 1300. First notch filter 212 is coupled to the first end of gain fiber 214. The s-polarized laser beam is reflected by PSD 204, which is an amplified laser beam 226. Amplified laser beam 226 may be coupled to an output fiber (not shown).

Figure 14:
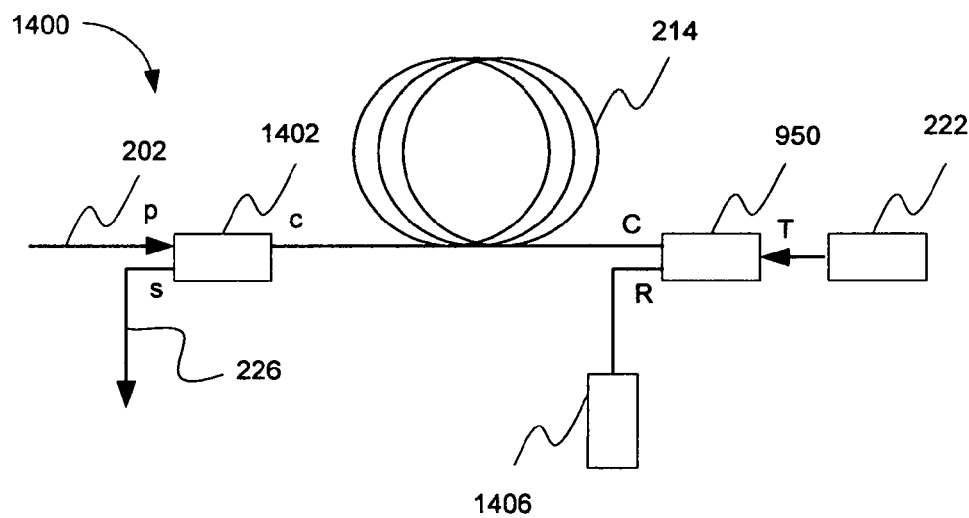
FIG. 14 illustrates embodiment of FIG. 13 comprising micro-optic-module components.
Figure 15:
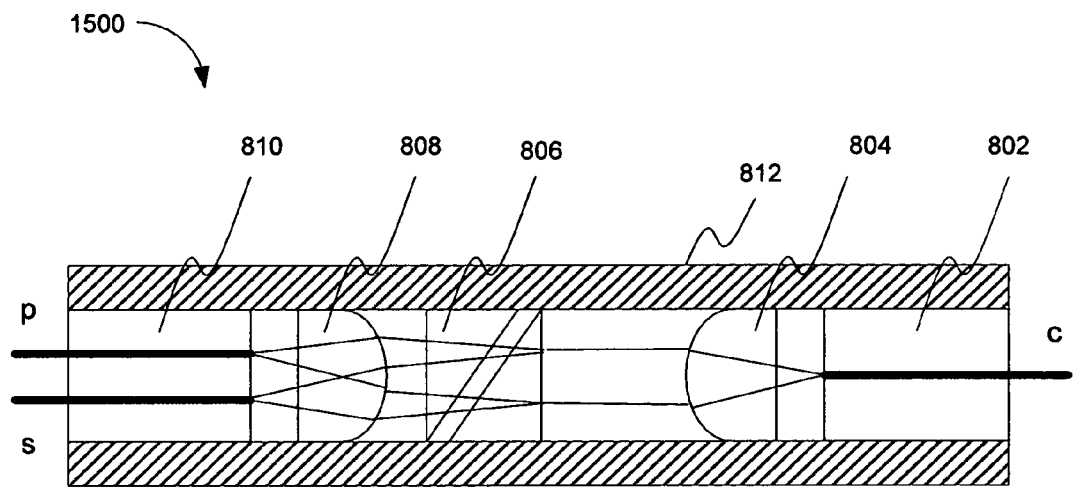
FIG. 15 illustrates an exemplary micro-optic-module PSD.

FIG. 14 illustrates an exemplary embodiment of multipass fiber amplifier 1400 similar to embodiment of multipass fiber amplifier 1300 of FIG. 13, according to the present invention. A micro-optic-module PSD 1402 comprises a Wollaston prism pair, a p-port fiber, a s-port fiber, and a c-port fiber. FIG. 15 illustrates micro-optic-module PSD 1500, which is the same as FPBCS 800 of FIG. 8, according to the present invention. However, for clarity and easy comparison with FIGS. 13 and 14, in FIG. 15 s-port and p-port are moved to the left side and c-port is moved to the right side.

Figure 16:
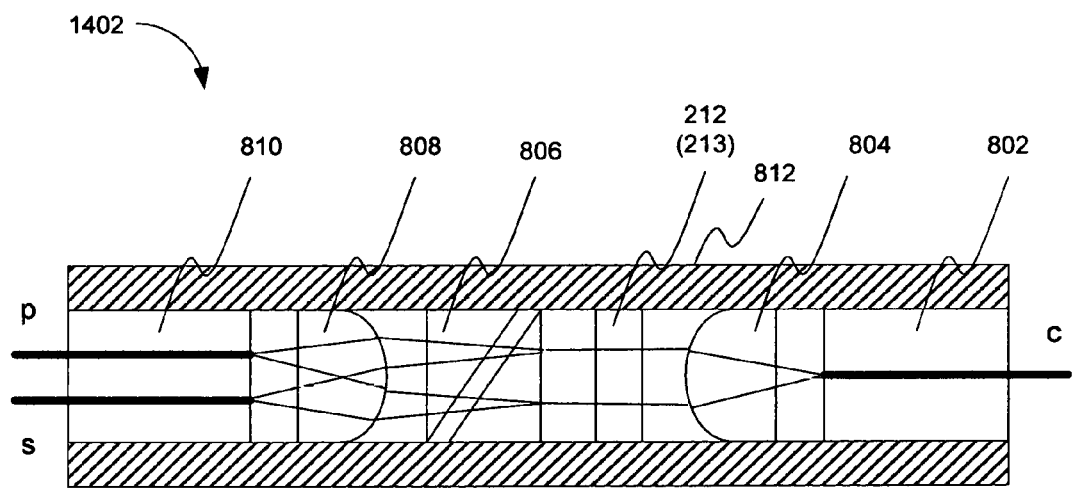
FIG. 16 illustrates an exemplary micro-optic-module PSD including an ASE blocking device.

In an embodiment, a first notch filter 212 or first ASE blocking device 213 may be included in micro-optic-module PSD 1500 becoming micro-optic-module PSD 1402 having p-port fiber, s-port fiber, and c-port fiber as shown in FIG. 16, according to the present invention. First notch filter 212 or first ASE blocking device 213 is disposed immediately between Wollaston prism pair 806 and first lens 804 coupled to the c-port fiber. In this manner, PSD 204 and first notch filter 212 or first ASE blocking device 213 of FIG. 13 are included in micro-optic-module PSD 1402 of FIG. 14.

Dichroic filter 216 of FIG. 13 is included in micro-optic-module WDM 950 of FIG. 14. Micro-optic-module WDM 950 comprising dichroic filter 910, C-port fiber 902, R-port fiber 904, and T-port fiber 912 is illustrated in FIG. 9A. Dichroic filter 910 may be dichroic filter 216 of FIG. 13.

Figure 17:
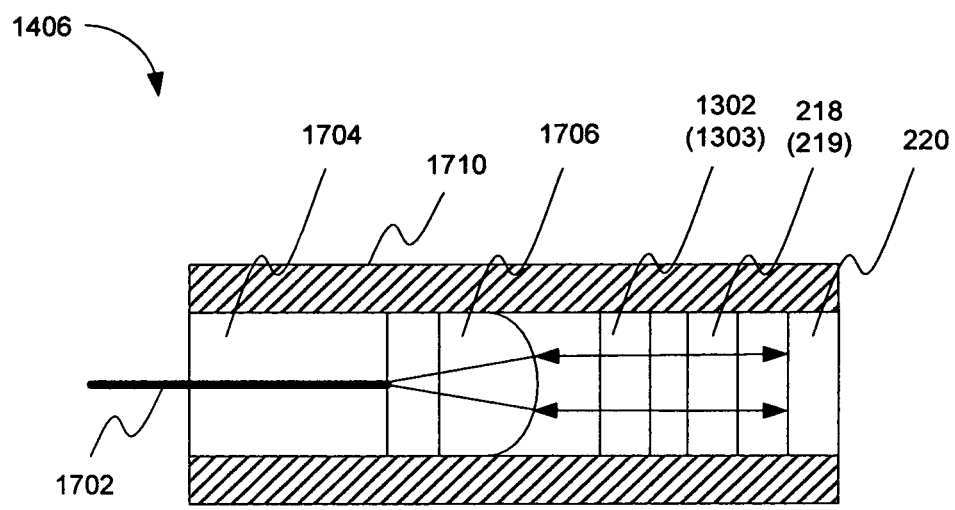
FIG. 17 illustrates an exemplary micro-optic-module 90° polarization rotating reflector including an ASE blocking device.

FIG. 17 illustrates that second notch filter 1302 or second ASE blocking device 1303, QWP 218 or Faraday rotator 219, and mirror 220 may be included in a micro-optic-module 90° polarization rotating reflector 1406, according to the present invention. A fiber 1702 inputs a laser beam to enter micro-optic-module 90° polarization rotating reflector 1406. Light reflected from micro-optic-module WDM 950 propagates in fiber 1702 entering 90° polarization rotating reflector 1406. Light coming from an end of fiber 1702 is collimated by a lens 1706. The collimated light passing through second notch filter 1302 or second ASE blocking device 1303 and QWP 218 or Faraday rotator 219 is reflected by a mirror 220. The reflected collimated light returns the path to enter the end of fiber 1702 and propagates toward micro-optic-module WDM 950 having 90° polarization rotation. The reflected collimated light is focused by lens 1706 on fiber 1702 for outputting the light having 90° polarization rotation. Fiber 1702 may be mounted in a capillary tube 1704. Capillary tube 1704, lens 1706, second notch filter 1302 or second ASE blocking device 1303, QWP 218 or Faraday rotator 219, and mirror 220 may be enclosed in a cylindrical tube 1710.

In this manner, the ASE included in the laser beam is blocked twice by first notch filter 212 (first ASE blocking device 213) from propagating in multipass fiber amplifier 1400. First notch filter 212 (first ASE blocking device 213) is coupled to the first end of gain fiber 214. The ASE included in the laser beam is also blocked twice by second notch filter 1302 (second ASE blocking device 1303) from propagating in multipass fiber amplifier 1400. Second notch filter 1302 (second ASE blocking device 1303) is coupled to the second end of gain fiber 214.

Embodiment 1300 of FIG. 13 removes first Faraday rotator 206, HWP 208, second PSD 210, and first mirror 224 from embodiment 200 of FIG. 2. Similarly, an embodiment 1800 of FIG. 18 removes first Faraday rotator 206, HWP 208, second PSD 210, and first mirror 224 from embodiment 500 of FIG. 5, according to the present invention. Embodiment 1800 of FIG. 18 is similar to embodiment 1300 of FIG. 13, except that dichroic filter 216 in embodiment 1300 reflects the laser light and transmits the pump light, and dichroic filter 216 in embodiment 1800 transmits the laser light and reflects the pump light.

Figure 18:
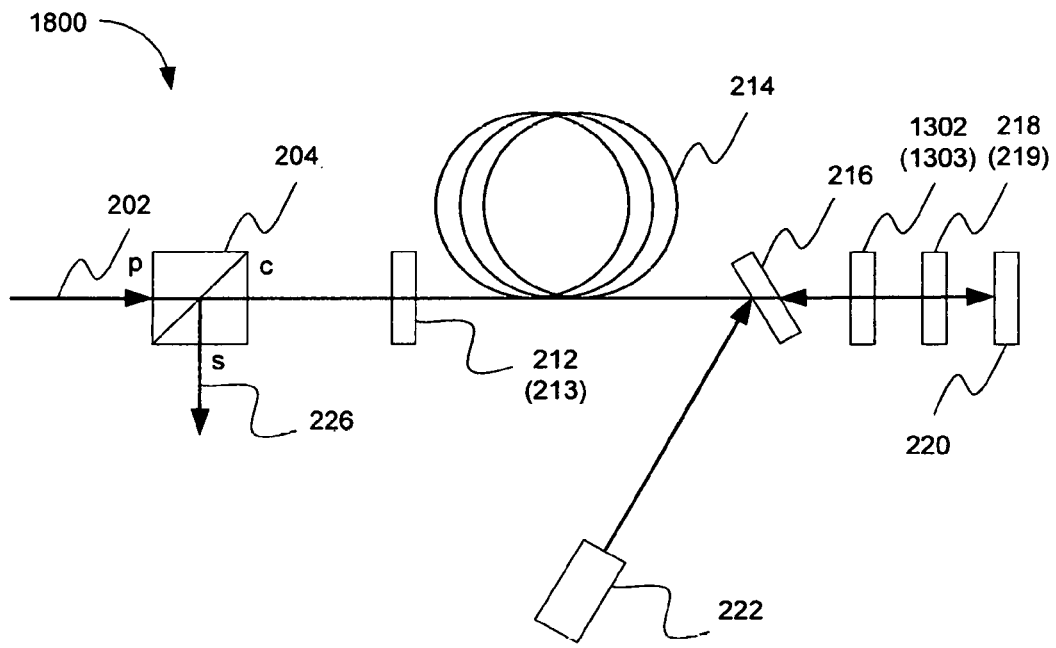
FIG. 18 illustrates another exemplary embodiment of multipass fiber amplifier comprising two ASE blocking devices coupled to two ends of a gain fiber.
Figure 19:
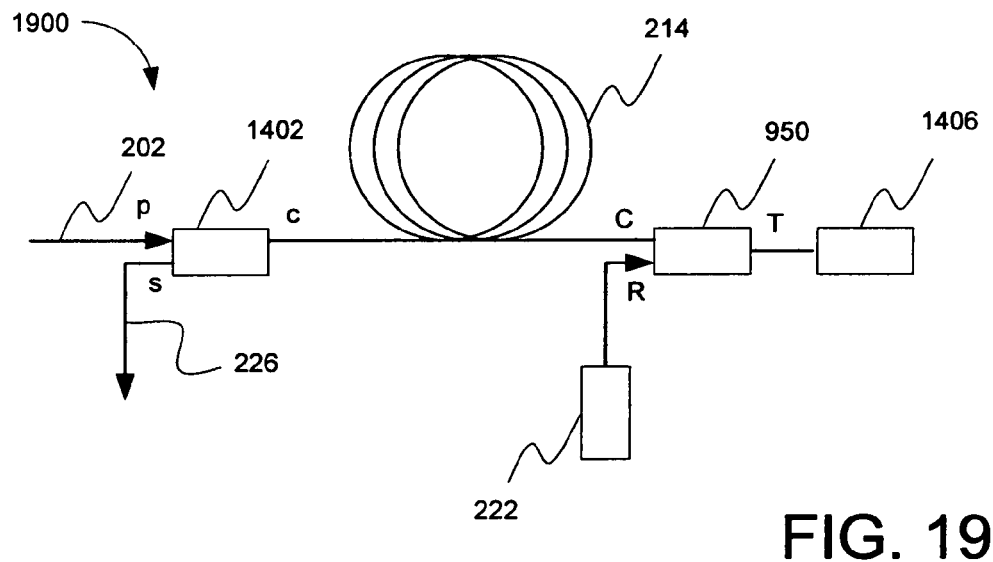
FIG. 19 illustrates embodiment of FIG. 18 comprising micro-optic-module components.

FIG. 19 illustrates an exemplary embodiment of multipass fiber amplifier 1900 similar to embodiment of multipass fiber amplifier 1800 of FIG. 18, according to the present invention. Micro-optic-module PSD 1402 includes first notch filter 1602 or first ASE blocking device 1603 as shown in FIG. 16, according to the present invention. Micro-optic-module 90° polarization rotating reflector 1406 includes second notch filter 1302 or second ASE blocking device 1303 as shown in FIG. 17, according to the present invention.

Micro-optic-module WDM 950 includes dichroic filter 216 (910) as shown in FIG. 9A, according to the present invention. Micro-optic-module WDM 950 in FIG. 19 is different from micro-optic-module WDM 950 of FIG. 14.

Dichroic filter 216 (910) in micro-optic-module WDM 950 of FIG. 14 reflects the laser light and transmits the pump light, and dichroic filter 216 (910) in micro-optic-module WDM 950 of FIG. 19 transmits the laser light and reflects the pump light.

In this manner, the ASE included in the laser beam is blocked twice by first notch filter 212 (first ASE blocking device 213) from propagating in multipass fiber amplifier 1900. First notch filter 212 (first ASE blocking device 213) is coupled to the first end of gain fiber 214. The ASE included in the laser beam is also blocked twice by second notch filter 1302 (second ASE blocking device 1303) from propagating in multipass fiber amplifier 1900. Second notch filter 1302 (second ASE blocking device 1303) is coupled to the second end of gain fiber 214.

Figure 20:
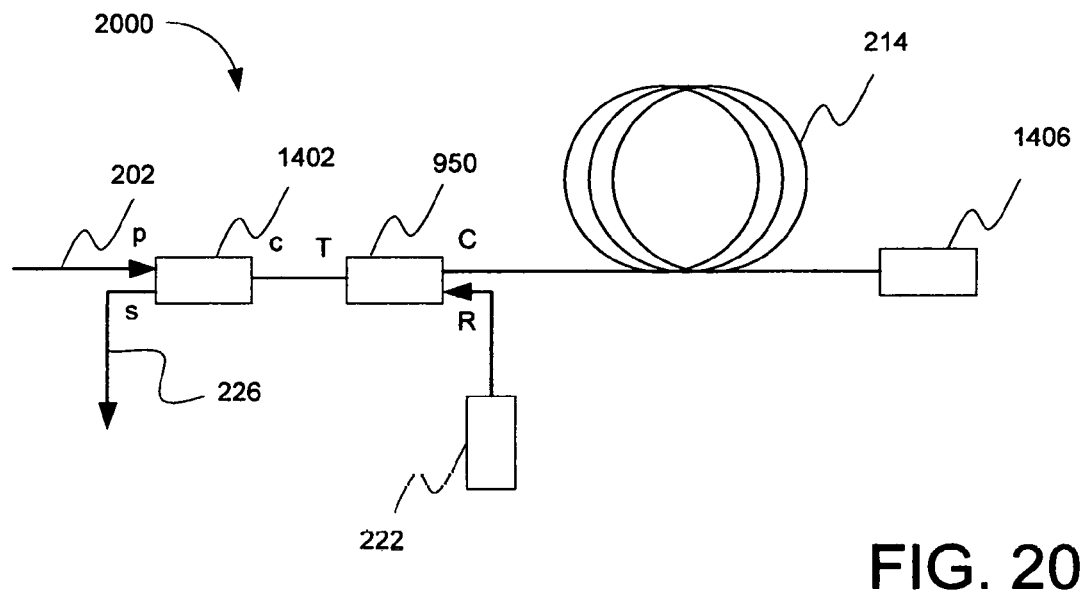
FIG. 20 illustrates yet another exemplary embodiment of multipass fiber amplifier comprising two ASE blocking devices coupled to two ends of a gain fiber and micro-optic-module components.

FIG. 20 illustrates an exemplary embodiment of multipass fiber amplifier 2000 similar to embodiment of multipass fiber amplifier 1900 of FIG. 19, according to the present invention. The difference is that micro-optic-module WDM 950 of FIG. 19 that transmits the laser light and reflects the pump light, and pump source 222 are moved from the second end of gain fiber 214 to the first end of gain fiber 214. The p-polarized laser beam passes through micro-optic-module PSD 1402 enters the T-port of micro-optic-module WDM 950 and transmits through micro-optic-module WDM 950 from its C-port to enter the first end of gain fiber 214.

It is appreciated that first ASE blocking device 213 included in micro-optic-module PSD 1402 remains coupled to the first end of gain fiber 214, and second ASE blocking device 1303 included in micro-optic-module 90° polarization rotating reflector 1406 remains coupled to the second end of gain fiber 214.

The ASE included in the laser beam is blocked twice by first notch filter 212 (first ASE blocking device 213) included in micro-optic-module PSD 1402 from propagating in multipass fiber amplifier 2000. First notch filter 212 (first ASE blocking device 213) is coupled to the first end of gain fiber 214. The ASE included in the laser beam is also blocked twice by second notch filter 1302 (second ASE blocking device 1303) included in micro-optic-module 90° polarization rotating reflector 1406 from propagating in multipass fiber amplifier 2000. Second notch filter 1302 (second ASE blocking device 1303) is coupled to the second end of gain fiber 214.

Figure 21:
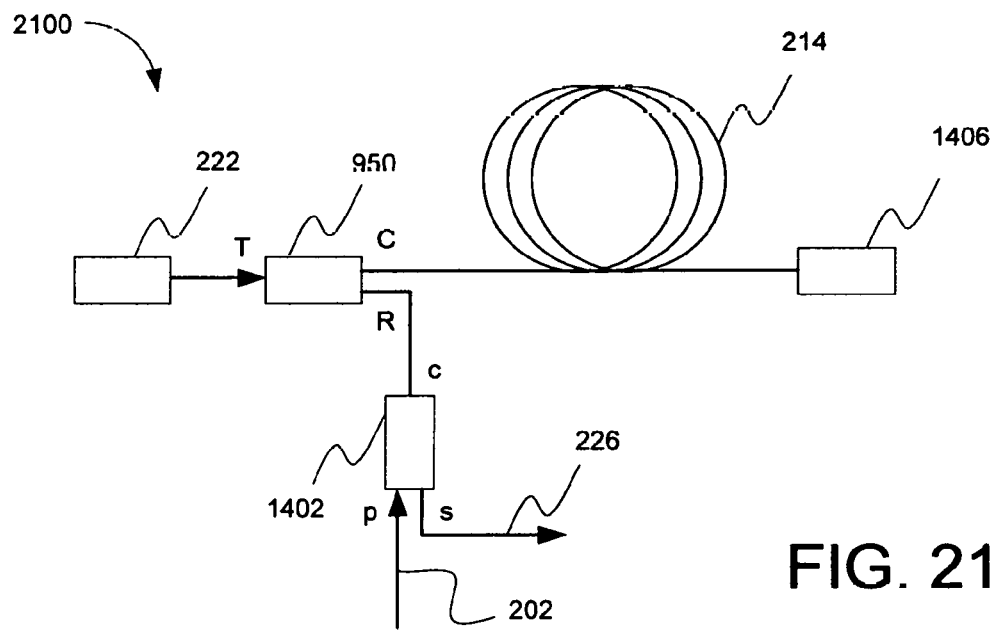
FIG. 21 illustrates further another exemplary embodiment of multipass fiber amplifier comprising two ASE blocking devices coupled to two ends of a gain fiber and micro-optic-module components Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

FIG. 21 illustrates an exemplary embodiment of multipass fiber amplifier 2100 similar to embodiment of multipass fiber amplifier 2000 of FIG. 20, according to the present invention. The difference is that pump source 222 is connected to the T-port of micro-optic-module WDM 950, and the c-port of micro-optic-module PSD 1402 is connected to the R-port of micro-optic-module WDM 950. Similar to multipass fiber amplifier 1400 of FIG. 14, micro-optic-module WDM 950 transmits the pump light coming from pump source 222 and reflects the laser light coming from the c-port of micro-optic-module PSD 1402. The p-polarized laser beam passes through micro-optic-module PSD 1402 enters the R-port of micro-optic-module WDM 950 and is reflected by micro-optic-module WDM 950 through its C-port to enter the first end of gain fiber 214.

It is appreciated that first ASE blocking device 213 included in micro-optic-module PSD 1402 remains coupled to the first end of gain fiber 214, and second ASE blocking device 1303 included in micro-optic-module 90° polarization rotating reflector 1406 remains coupled to the second end of gain fiber 214.

The ASE included in the laser beam is blocked twice by first notch filter 212 (first ASE blocking device 213) included in micro-optic-module PSD 1402 from propagating in multipass fiber amplifier 2100. First notch filter 212 (first ASE blocking device 213) is coupled to the first end of gain fiber 214. The ASE included in the laser beam is also blocked twice by second notch filter 1302 (second ASE blocking device 1303) included in micro-optic-module 90° polarization rotating reflector 1406 from propagating in multipass fiber amplifier 2100. Second notch filter 1302 (second ASE blocking device 1303) is coupled to the second end of gain fiber 214.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof. For the disclosed methods, the steps need not necessarily be performed sequentially. For the disclosed apparatuses, the order of elements may be changed while the operation principle is the same.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A system comprising:
   a polarization separating device for transmitting a laser beam having a first polarization and reflecting the laser beam having a second polarization, the first polarization and the second polarization are perpendicular;
   a first amplified-spontaneous-emission (ASE) blocking device;
   at least a pump source for providing pump light;
   a wavelength-division multiplexer (WDM) including a dichoric filter and having a C-port fiber, a R-port fiber, and a T-port fiber, for combining the pump light and the laser beam;
   a second amplified-spontaneous-emission (ASE) blocking device;
   a 90° polarization rotating reflector for reflecting the laser beam and rotating a polarization of the reflected laser beam by 90°; and
   a gain fiber having a first end and a second end for amplifying the laser beam using the pump light;
   wherein the first ASE blocking device is coupled to the first end of the gain fiber and the second ASE blocking device is coupled to the second end of the gain fiber; and
   wherein the polarization separating device and the first ASE blocking device are included in a micro-optic-module polarization separating device.

2. The system of claim 1, wherein the 90° polarization rotating reflector comprises one of a quarter-wave plate and a Faraday rotator, and a mirror for reflecting the laser beam.

3. The system of claim 1, wherein the first ASE blocking device is one of a notch filter, a spatial filter, and a time gated temporal filter.

4. The system of claim 1, wherein the second ASE blocking device is one of a notch filter, a spatial filter, and a time gated temporal filter.

5. The system of claim 1, wherein the gain fiber is one of a polarization maintaining fiber and a regular fiber.

6. The system of claim 1, wherein the first polarization separating device comprises a c-port fiber, a s-port fiber, a p-port fiber, and a Wollaston prism pair.

7. The system of claim 1, wherein the dichroic filter is included in one of a wavelength-division multiplexer (WDM) comprising R-port fiber, C-port fiber, and T-port fiber and a WDM comprising two fibers.

8. The system of claim 1, wherein the pump source is one of a laser diode and a light emitting diode.

9. The system of claim 1, the micro-optic-module polarization separating device comprising:
a p-port fiber, a s-port fiber, and a c-port fiber;
a pair of Wollaston prisms;
a first collimating lens for collimating the laser beam entering from the c-port fiber;
a second collimating lens for collimating the laser beam entering from the s-port fiber and the p-port fiber; and
the first ASE blocking device disposed between the pair of Wollaston prisms and the first collimating lens.

10. The system of claim 1, wherein the 90° polarization rotating reflector and the second ASE blocking device are included in a micro-optic-module 90° polarization rotating reflector.

11. The system of claim 10, the micro-optic-module 90° polarization rotating reflector comprising:
a fiber for inputting the laser beam to the micro-optic-module 90° polarization rotating reflector;
a lens for collimating the laser beam entering from the fiber;
the second ASE blocking device;
one of a quarter-wave plate and a Faraday rotator; and
a mirror for reflecting the laser beam collimated by the lens and passing through the second ASE blocking device and the one of a quarter-wave plate and a Faraday rotator;
wherein the reflected laser beam passes through the one of a quarter-wave plate and a Faraday rotator, and the second ASE blocking device, and is focused by the lens on the fiber for outputting the laser beam.

12. A multipass fiber amplifier comprising:
a micro-optic-module polarization separating device for transmitting a laser beam having a first polarization and reflecting the laser beam having a second polarization, the first polarization and the second polarization are perpendicular, the micro-optic-module polarization separating device comprising:
a p-port fiber, a s-port fiber, and a c-port fiber;
a pair of Wollaston prisms;
a first collimating lens for collimating the laser beam entering from the c-port fiber;
a second collimating lens for collimating the laser beam entering from the s-port fiber and the p-port fiber; and
a first ASE blocking device disposed between the pair of Wollaston prisms and the first collimating lens;
a micro-optic-module 90° polarization rotating reflector comprising:
a fiber for inputting the laser beam to enter the micro-optic-module 90° polarization rotating reflector;
a lens for collimating the laser beam entering from the fiber;
a second ASE blocking device;
one of a quarter-wave plate and a Faraday rotator; and
a mirror for reflecting the laser beam collimated by the lens and passing through the second ASE blocking device and the one of a quarter-wave plate and a Faraday rotator;
wherein the reflected laser beam passes through the one of a quarter-wave plate and a Faraday rotator, and the second ASE blocking device, and is focused by the lens on the fiber for outputting the laser beam;
a pump source for providing pump light;
a micro-optic-module wavelength-division multiplexer (WDM) comprising:
a C-port fiber, a R-port fiber, a T-port fiber; and
a dichoric filter for combining the pump light and the laser beam;
a gain fiber having a first end and a second end for amplifying the laser beam using the pump light;
wherein the first ASE blocking device is coupled to the first end of the gain fiber and the second ASE blocking device is coupled to the second end of the gain fiber.

13. The multipass fiber amplifier of claim 12, wherein the first end of the gain fiber is connected to the c-port of the micro-optic-module polarization separating device, and the second end of the gain fiber is connected to the C-port of the micro-optic-module WDM.

14. The multipass fiber amplifier of claim 13, wherein the micro-optic-module 90° polarization rotating reflector is connected to the R-port of the micro-optic-module WDM and the pump source is connected to the T-port of the micro-optic-module WDM.

15. The multipass fiber amplifier of claim 13, wherein the micro-optic-module 90° polarization rotating reflector is connected to the T-port of the micro-optic-module WDM and the pump source is connected to the R-port of the micro-optic-module WDM.

16. The multipass fiber amplifier of claim 12, wherein the first end of the gain fiber is connected to the C-port of the micro-optic-module WDM, and the second end of the gain fiber is connected to the micro-optic-module 90° polarization rotating reflector.

17. The multipass fiber amplifier of claim 16, wherein the c-port of the micro-optic-module polarization separating device is connected to the T-port of the micro-optic-module WDM and the pump source is connected to the R-port of the micro-optic-module WDM.

18. The multipass fiber amplifier of claim 16, wherein the c-port of the micro-optic-module polarization separating device is connected to the R-port of the micro-optic-module WDM and the pump source is connected to the T-port of the micro-optic-module WDM.

19. The multipass fiber amplifier of claim 12, wherein the first ASE blocking device and the second ASE blocking device are notch filters.

* * * * *